United States Patent [19]

Spencer

[11] Patent Number: 5,069,470
[45] Date of Patent: Dec. 3, 1991

[54] BICYCLE TRANSMISSION CLEANING APPARATUS

[76] Inventor: Robert A. Spencer, 31935 Via Coyote, Coto de Caza, Calif. 92679

[21] Appl. No.: 579,106

[22] Filed: Sep. 6, 1990

Related U.S. Application Data

[63] Continuation of Ser. No. 286,286, Dec. 19, 1988, abandoned.

[51] Int. Cl.⁵ .............................................. F16H 57/05
[52] U.S. Cl. .................................. 280/288.4; 474/92; 184/15.1
[58] Field of Search ...................... 280/288.4, 295, 261; 474/91, 92; 184/15.1

[56] References Cited

U.S. PATENT DOCUMENTS

| | | | |
|---|---|---|---|
| 635,778 | 10/1899 | Hudelson | 474/92 |
| 648,724 | 5/1900 | Cole | 474/92 |
| 3,931,991 | 1/1976 | Marchello | 280/295 |
| 4,280,591 | 7/1981 | Newcomb | 474/91 |
| 4,593,923 | 6/1986 | Thalmann | 474/92 |

Primary Examiner—Kenneth R. Rice
Assistant Examiner—Mitchell Bompey
Attorney, Agent, or Firm—Frank J. Uxa, Jr.; Gordon L. Peterson

[57] ABSTRACT

An apparatus useful for cleaning the debris-laden transmission of an assembled bicycle having a bicycle frame, the transmission including chainrings and a free wheel gear cluster. The apparatus comprises a first reservoir adapted to be secured to the bicycle in proximity to the chainrings, the first reservoir including a first receptacle adapted to hold a quantity of liquid cleaning composition and to collect debris removed from the chainrings; and a second reservoir adapted to be secured to the bicycle separately from the first reservoir in proximity to the free wheel gear cluster, the second reservoir including a second receptacle adapted to hold a quantity of liquid cleaning composition and to collect debris removed from the free wheel gear cluster.

19 Claims, 2 Drawing Sheets

BICYCLE TRANSMISSION CLEANING APPARATUS

This application is a continuation of application Ser. No. 286,286, filed Dec. 19, 1988 now abandoned.

BACKGROUND OF THE INVENTION

This invention relates to an apparatus for cleaning bicycle transmissions. More particularly the invention relates to cleaning the transmission of a bicycle without substantial disassembly of the assembled bicycle.

Bicycling is a very popular and enjoyable activity. However, quite often during use of the bicycle the transmission of the bicycle becomes dirtied by debris, e.g., from the road or other route on which the bicycle is used. Not only is a dirty bicycle transmission unsightly, but it may also adversely affect the performance of the bicycle.

One approach to cleaning bicycle transmissions has been to disassemble the bicycle, or at least its transmission, clean the dirty transmission components, e.g., with a solvent or the like, and then reassemble the bicycle. This is a time consuming, and often a labor intensive procedure. Moreover, since quite fine adjustments are frequently required for optimum bicycle performance, the reassembled bicycle may not be as "finely tuned" as the bicycle was before disassembling and cleaning. Clearly, it would be advantageous to be able to clean a bicycle transmission without requiring that the bicycle be disassembled.

One device which has been used to clean bicycle chains is sold by Orleander S.A. under the trademark Vetta Chain Cleaner. This device includes a single container for cleaning liquid and is hung or clamped at the bicycle's derailleurs. This device does not effectively clean the other components of the bicycle's transmission. Thus, although the chain may be cleaned when using this device, afterward the chain becomes dirty from the debris on the other transmission components. More than just the chain should be cleaned.

As used herein, the term "transmission" or "bicycle transmission" refers to the chainrings, the chain and the free wheel gear means. Preferably included within the meaning of these terms are the front derailleur and/or the rear derailleur. The free wheel gear means includes the free wheel gear cluster.

SUMMARY OF THE INVENTION

A new system useful for cleaning one or more components of a bicycle transmission has been discovered. This system allows the transmission component or components, preferably the entire bicycle transmission, to be effectively and efficiently cleaned without any substantial disassembling of the bicycle or transmission. Thus, the bicycle remains assembled while the transmission components are being cleaned. The ease of using the present system promotes its frequent use so that the bicycle, over a period of time, has a cleaner transmission and operates at a higher level of performance.

In one broad aspect, the present invention is directed to an apparatus useful for cleaning the debris-laden transmission components of an assembled bicycle having a bicycle frame. This apparatus comprises a first reservoir and/or a second reservoir, preferably both first and second reservoirs. The first reservoir is adapted to be secured to the bicycle, preferably to the bicycle frame, in proximity to the chainrings. The first reservoir includes a first receptacle adapted to hold a quantity of liquid cleaning composition and to collect debris removed from the chainrings. The second reservoir is adapted to be secured to the bicycle, preferably secured to the bicycle separately from the first reservoir, in proximity to the free wheel gear means. This second reservoir includes a second receptacle adapted to hold a quantity of liquid cleaning composition and to collect debris removed from the free wheel gear means.

Each of the first and second reservoirs preferably includes a front wall and a back wall of unequal heights. The front wall is preferably relatively low and the back wall is preferably relatively high. The relatively low front walls allow access to the chainrings or free wheel gear means, as the case may be, so that liquid cleaning composition from the receptacles can be manually applied to the chainrings or free wheel gear means. The relatively high back walls act to reduce the amount of cleaning composition and/or debris from these transmission components contacting other parts of the bicycle. In effect, the reservoirs are preferably configured to allow front access to the transmission components while reducing, more preferably substantially eliminating, undue splashing of other bicycle components with cleaning composition and debris.

The present apparatus is very effectively used to clean debris from bicycle transmission components. A cleaning method using the present apparatus comprises placing the first reservoir in proximity to the chainrings and securing the first reservoir to the bicycle, preferably to the bicycle frame. The second reservoir is placed in proximity to the free wheel gear means and the second reservoir is secured to the bicycle, preferably to at least one of the rear axle and the rear hub of the bicycle. Liquid cleaning composition is applied, e.g., from the first and second receptacles, to the chainrings and free wheel gear means, respectively. Debris and liquid cleaning composition from the chainrings and free wheel gear means are caused to collect in the first and second receptacles, respectively. This application step is repeated until the desired degree of cleaning has occurred. The chain can also be effectively cleaned by rotating the chain during or after, preferably during, the application step or steps. After the desired degree of cleaning has taken place, and excess cleaning composition has been collected in the receptacles, the reservoirs are removed from the bicycle. At this point, the bicycle is immediately ready to be used.

Cleaning the bicycle transmission using the present system is easy, effective and requires little time. For example, the entire transmission of a bicycle can be cleaned in a period of time in the range of about 10 minutes to about 1 hour, preferably in the range of about 10 minutes to about 15 minutes. Moreover, no bicycle downtime in involved for bicycle disassembly and reassembly. The ease and quickness with which this system can be used promotes its frequent use so that bicycle transmission cleanliness and improved bicycle performance are promoted.

These and other aspects and advantages of the present invention are set forth in the following detailed description and claims, particularly when considered in conjunction with the accompanying drawings in which like parts bear like reference numerals.

DETAILED DESCRIPTION OF THE DRAWINGS

Figure 1:
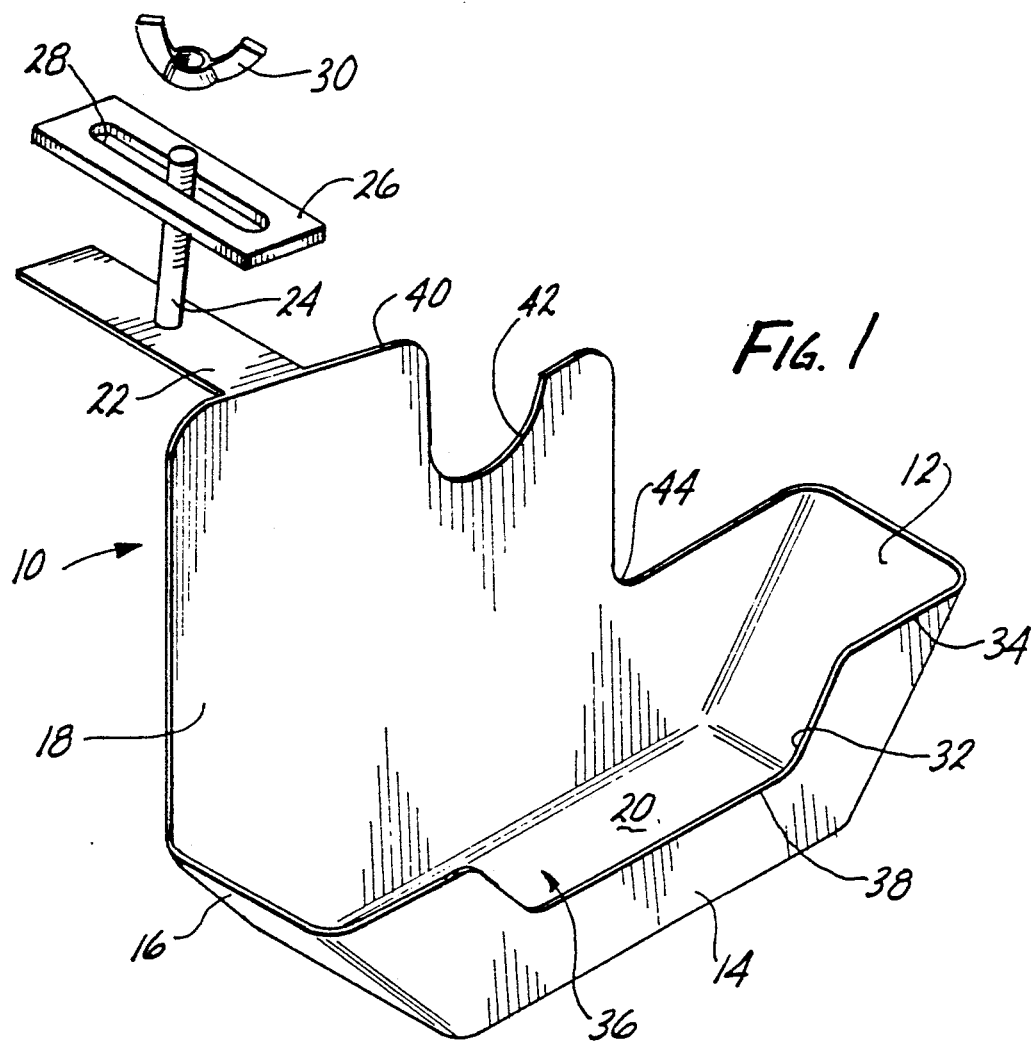
FIG. 1 is a front side view, in perspective, of one embodiment of a reservoir of the present invention.
Figure 3:
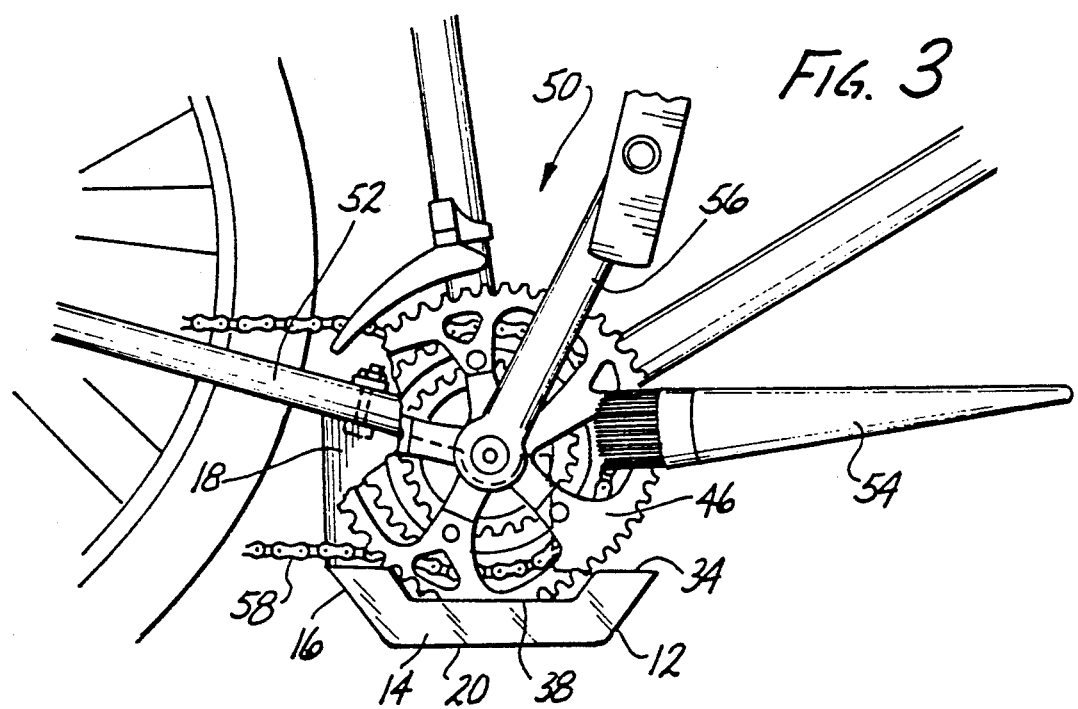
FIG. 3 is a front plan view, partly cut away, showing the embodiment of FIG. 1 secured to a bicycle.

Referring now to FIGS. 1 and 3, a front reservoir, shown generally at 10, includes a first sidewall 12, a front wall 14, a second sidewall 16, a back wall 18, and a bottom wall 20. In addition, a mounting plate 22 extends generally backwardly from back wall 18 and includes a generally upwardly extending, threaded mounting bolt 24. Also, included is a top plate 26, which has a slot 28 therethrough, and a wing nut 30, which is sized and adapted to fit onto and matingly engage the threads of mounting bolt 24.

Both first and second sidewalls 12 and 16 are slanted inwardly toward bottom wall 20. Front wall 14 and back wall 18 are generally mutually parallel and perpendicular to bottom wall 20. Front wall 14 includes an opening 32 which extends downwardly from the top 34 of front wall 14, but terminates above bottom wall 20. Opening 32 is configured to allow better access to the chainrings of the bicycle, as discussed hereinafter. The space 36, defined by a (imaginary) plane generally perpendicular to back wall 18 between the bottom 38 of opening 32 and back wall 18, first and second sidewalls 12 and 16, front and back walls 14 and 18 and bottom wall 20, is suitable for holding a quantity of liquid cleaning composition, e.g., a petroleum-based solvent or the like. Preferably, to avoid spillage, the amount of liquid cleaning solvent used is such that space 36 is not completely filled. The configuration of reservoir 10 is such that the top of space 36, i.e., the above-noted plane, has a larger cross-sectional area than the bottom of space 36, i.e., bottom wall 20. This configuration facilitates the settling of debris from the bicycle's chainrings toward the bottom of space 36, which leaves an upper layer of liquid cleaning composition in space 36 relatively uncontaminated and available for further cleaning.

Back wall 18 is taller or higher, at its highest point, than front wall 14. That is, the top 40 of back wall 18 is further away from bottom wall 20 than is the top 34 of front wall 14. This relatively big back wall 18 acts to protect other components of the bicycle from being splashed by liquid cleaning composition and debris from the chainrings. In addition, back wall 18 includes a downwardly extending notch 42 which is sized to fit around the bicycle frame, e.g., the bottom bracket of the bicycle frame, when front reservoir 10 is secured to the bicycle frame. Further, back wall 18 is truncated at the end away from mounting plate 22. That is, back wall 18 has a reduced height, equal to the height of front wall 14 at top 34, between first sidewall 12 and turn 44. Having back wall 18 truncated, or cut back, in this area provides access to the back side of the chainrings when front reservoir 10 is secured to the bicycle frame. This additional access facilities cleaning debris from the chainrings.

Mounting plate 22 extends generally backwardly from back wall 18 and is preferably situated so that bottom wall 20 is substantially parallel to the ground when front reservoir 10 is secured to the bicycle frame.

Front reservoir 10 is secured to the bicycle by securing mounting plate 22 and top plate 26 around a component of the bicycle's frame, e.g., the chain stays, using mounting bolt 24 and first wing nut 30. Top plate 26 includes elongated slot 28 which allows lateral adjustment in mounting front reservoir 10 to the bicycle frame.

Front reservoir 10 functions as follows. Wing nut 30 and top plate 26 are removed from mounting bolt 24. Front reservoir 10 is then placed beneath the chainrings 46 of bicycle 50, as shown in FIG. 3. Thus, back wall 18 is placed behind the chainrings 46 with bottom wall 20 directly below chainrings 46. Mounting plate 22 is beneath the chain stays 52 with mounting bolt 25 extending upwardly between the chain stays 52. Top plate 26 is placed so that the free end of mounting bolt 26 passes through slot 28 and top plate 26 contacts the top of the chain stays 52. Wing nut 30 is threaded onto mounting bolt 24 and tightened to hold the chainstays 52 between mounting plate 22 and top plate 26. This secures front reservoir 10 in place, as shown in FIG. 3.

Front reservoir 10 is preferably sized sufficiently large to collect or capture substantially all of the liquid cleaning composition applied to the chainrings 46 and the debris removed from the chainrings 46.

A quantity of liquid cleaning composition is placed in the bottom ½ inch (approximately) of the receptacle or space 36 of the front reservoir 10. Using a brush 54, or other suitable instrument, portions of this composition are manually applied to the chainrings 46, and associated components, e.g., front derailleur, etc. Because of the truncated nature of back wall 18, this composition can also be applied to the back side of chainrings 46. The pedal crank 56 is preferably rotated during the cleaning operation to facilitate cleaning of the chain 58, the chainrings 46 and associated components. The liquid run-off and debris from the chainrings 46 are collected in front reservoir 10. After the desired cleaning has occurred, wing nut 30 and top plate 26 are removed from mounting bolt 22. This allows front reservoir 10 to be removed from bicycle 50 and bicycle 50 is immediately available for use.

Figure 2:
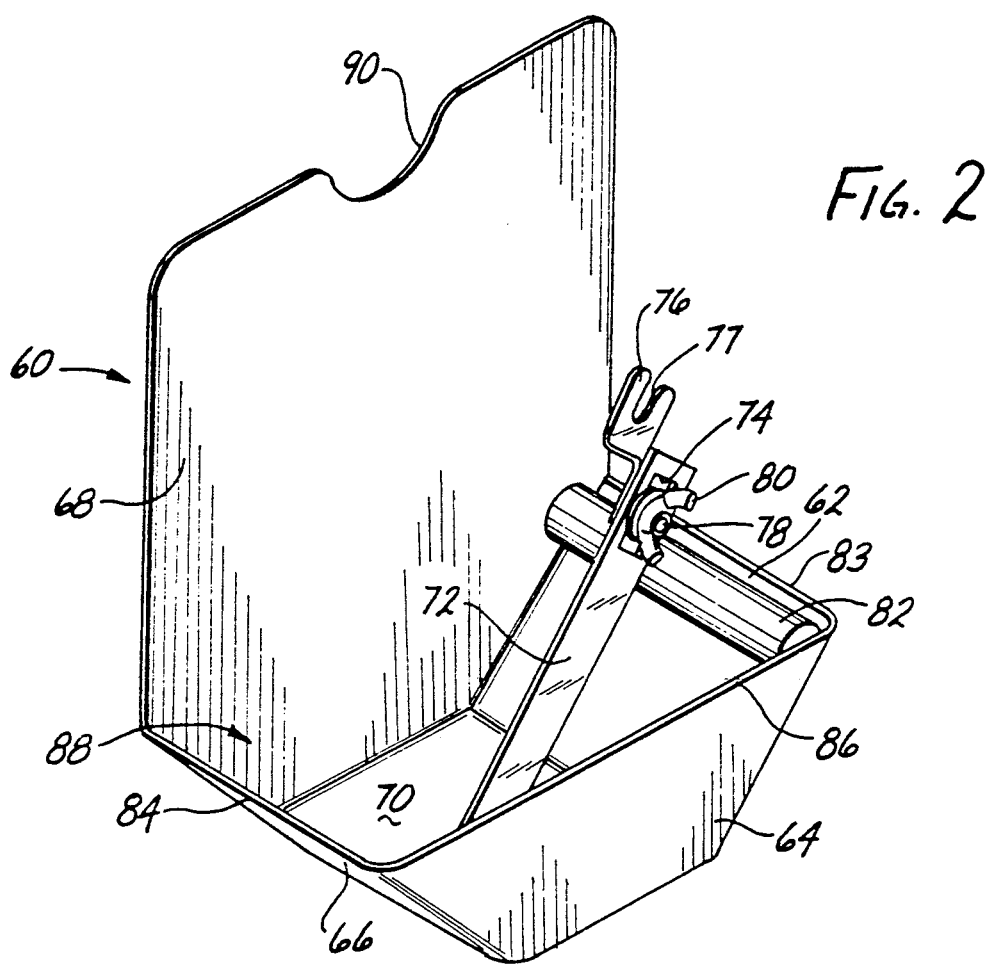
FIG. 2 is a front side view, in perspective, of one embodiment of another reservoir of the present invention.
Figure 4:
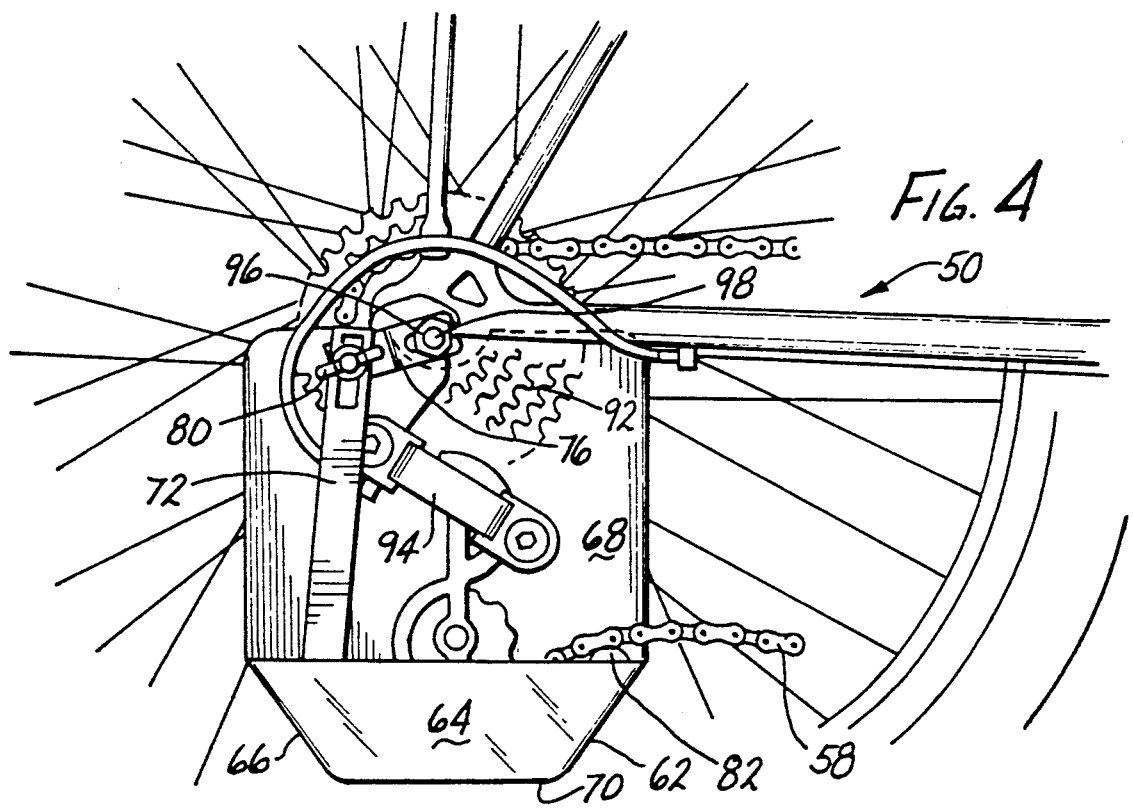
FIG. 4 is a front plan view showing the embodiment of FIG. 2 secured to a bicycle.

Referring now to FIGS. 2 and 4, a rear reservoir, shown generally at 60, includes a first sidewall 62, a front wall 64, a second sidewall 66, a back wall 68 and a bottom wall 70. In addition, a mounting arm 72 is secured to front wall 64 and includes a slot 74 located near the end opposite the end secured to front wall 64. Mounting arm 72 can be pivoted around its securement point on front wall 64. An arm extension 76, including an open ended slot 77, is secured to mounting arm 72 by passing a bolt member 78 through slot 74 and attaching wing nut 80 to the end of bolt member 78. A nylon cylinder 82 is secured to both front wall 64 and back wall 68 so that cylinder 82 can rotate about its longitudinal axis.

Both first and second sidewall 62 and 66 are slanted inwardly toward bottom wall 70. Front wall 64 and back wall 68 are generally mutually parallel and perpendicular to bottom wall 70. First and second sidewalls 62 and 66 and front wall 64 have tops 83, 84 and 86, respectively, each of which is at substantially the same height above bottom wall 70. The space 88, defined by a plane (an imaginary plane) passing through tops 83, 84 and 86, first and second sidewalls 62 and 66, front, back and bottom walls 64, 68 and 70, respectively, is suitable for holding a quantity of liquid cleaning composition, e.g., a petroleum-based solvent or the like. Preferably, space 88 is not completely filled with the liquid cleaning composition. The configuration of rear reservoir 60 is such that the top of space 88, i.e., the imaginary plane passing through tops 83, 84 and 86, has a larger cross-sectional area than the bottom of space 88, i.e., bottom wall 70. This configuration facilitates the settling of debris from the bicycle's free wheel gear cluster toward the bottom of space 88 which leaves an upper layer of liquid cleaning composition in space 88 relatively uncontaminated and available for further cleaning.

Back wall 68 is taller or higher than front wall 64. This relatively big back wall 68 acts to protect other components of the bicycle from being splashed by liquid cleaning composition and debris from the free wheel gear cluster. In addition, back wall 68 includes a downwardly extending indent 90 which is sized to fit around the rear wheel hub, e.g., against the rear hub between the free wheel gear cluster and the rear hub flange, of the bicycle when the rear reservoir 60 is secured to the rear axle of the bicycle.

Rear reservoir 60 functions as follows. Rear reservoir 60 is placed around and beneath the free wheel gear cluster 92 and rear derailleur 94 of bicycle 50, as shown in FIG. 4. The rear axle nut 96 is loosened on rear axle 98, and arm extension 76 is positioned so that open ended slot 77 receives rear axle 98. Rear axle nut 96 is then tightened on rear axle 98 to secure arm extension 76 to rear axle 98. Rear reservoir 60 is also useful with bicycles having a quick release rear axle. Arm extension 76 is secured to such quick release rear axles by tightening the quick release skewer. In any event, once arm extension 76 is secured to rear axle 98, wing nut 80 is tightened to immobilize arm extension relative to mounting arm 72. Before this last tightening operation, the position of rear reservoir 60 can be adjusted so that bottom wall 70 is substantially parallel to the ground.

Rear reservoir 60 is preferably sized sufficiently large to collect or capture substantially all of the liquid cleaning composition applied to the free wheel gear cluster 92 and the debris removed from the free wheel gear cluster 92.

A quantity of liquid cleaning composition is placed in the bottom ½ inch (approximately) of the receptacle or space 88 of the rear reservoir 60. Using the brush 54, or other suitable instrument, portions of this composition are manually applied to free wheel gear cluster 92 and associated components, e.g., rear derailleur 94, etc. The pedal crank 56 (shown is FIG. 3) is preferably rotated during this cleaning operation to facilitate cleaning of chain 58, rear wheel gear cluster 92 and associated components. Cylinder 82 functions to rotate as chain 58 rotates to reduce wear on the chain 58 and the other components of rear reservoir 60, and to reduce the amount of excess liquid cleaning composition carried by chain 58 out of space 88. The liquid run-off and debris from the free wheel gear cluster 92 is collected in rear reservoir 60. After the desired cleaning has occurred, rear axle nut 96 is loosened on the rear axle 98 and arm extension 78 is removed from rear axle 98. This allows rear reservoir 60 to be removed from bicycle 50. Rear axle nut 96 is then tightened on rear axle 98 and bicycle 50 is immediately available for use.

Of course, front reservoir 10 and rear reservoir 60 can be, and preferably are, used together at the same time. Thus, substantially the entire transmission of bicycle 50 can be cleaned while the bicycle remains assembled. The reservoirs can be used while the bicycle 50 stands freely against a wall or is placed in a mechanic's work stand. Use of the present system saves considerable time associated with the conventional practice of bicycle transmission disassembly for cleaning and avoids potential problems due to maladjustment of components on reassembly.

While this invention has been described with respect to various specific examples and embodiments, it is to be understood that the invention is not limited thereto and that it can be variously practiced within the scope of the following claims.

What is claimed is:

1. An apparatus useful for cleaning the debris-laden transmission of an assembled bicycle having a bicycle frame, the transmission including chainrings and free wheel gear means, which apparatus comprises:

a first reservoir adapted to be secured to the bicycle in proximity to the chainrings, said first reservoir including a first receptacle adapted to hold a quantity of liquid cleaning composition and to collect debris removed from the chainrings, said first reservoir having a first securement assembly which includes a mounting plate, a bolt secured to said mounting plate, a top plate adapted to capture one or more components of the bicycle frame between said top plate and said mounting plate and to have said bolt pass through said top plate, and a nut adapted to receive said bolt to hold said component or components of said bicycle frame between said mounting plate and said top plate; and a second reservoir adapted to be secured to the bicycle separately from said first reservoir in proximity to the free wheel gear means, said second reservoir including a second receptacle adapted to hold a quantity of liquid cleaning composition and to collect debris removed from the free wheel gear means.

2. The apparatus of claim 1 wherein each of said first and second reservoirs includes a front wall and a back wall of unequal heights, said front walls being relatively low to allow access to the chainrings and the free wheel gear means, respectively, so that liquid cleaning composition from said first and second receptacles can be manually applied to the chainrings and the free wheel gear means, respectively, and said back wall being relatively high to reduce the amount of liquid cleaning composition and debris contacting other parts of the bicycle.

3. The apparatus of claim 1 wherein the bicycle frame includes chain stays and said first reservoir is adapted to be secured to the chain stays.

4. The apparatus of claim 1 wherein said top plate is slotted to allow for lateral adjustment of said first reservoir relative to said bicycle frame.

5. The apparatus of claim 1 wherein said first and second receptacles each have a configuration so that the top cross-section is larger than the bottom cross-section.

6. The apparatus of claim 1 wherein said first reservoir is sufficiently large to catch substantially all of the run-off of liquid cleaning composition from the chainrings.

7. A method for cleaning debris from the debris-laden transmission of an assembled bicycle having a bicycle frame and a rear axis, the transmission including chainrings and free wheel gear means, which method comprises:

placing the first receptacle of claim 1 in proximity to the chainrings and securing said first reservoir to the bicycle frame;

placing the second receptacle of claim 1 in proximity to the free wheel gear means and securing said second reservoir to the rear axle;

applying liquid cleaning composition from said first receptacle to the chainrings and causing debris and liquid cleaning composition from the chainrings to collect in said first receptacle;

applying liquid cleaning composition from said second receptacle to the free wheel gear means and causing debris and liquid cleaning composition from the free wheel gear means to collect in said second receptacle;

removing said first reservoir from the bicycle frame; and removing said second reservoir from the rear axle.

8. The method of claim 7 wherein liquid cleaning composition from said first receptacle is manually applied to the chainrings, and liquid cleaning composition from said second receptacle is manually applied to the free wheel gear means.

9. An apparatus useful for cleaning the debris-laden chainrings of an assembled bicycle having a bicycle frame comprising:

a reservoir adapted to be secured to the bicycle frame in proximity to the chainrings;

said reservoir including a securement assembly which includes a mounting plate, a bolt secured to said mounting plate, a top plate adapted to capture one or more components of the bicycle frame between said top plate and said mounting plate and to have said bolt pass through said top plate, and a nut adapted to receive said bolt to hold said component or components of said bicycle frame between said mounting plate and said top plate;

said reservoir further including a receptacle adapted to hold a quantity of liquid cleaning composition and to collect debris removed from the chainrings; and said reservoir still further including a front wall and a back wall of unequal heights, said front wall being relatively low to allow access to the chainrings so that liquid cleaning composition from said receptacle can be manually applied to the chainrings, and said rear wall being relatively high to reduce the amount of liquid cleaning composition and debris contacting other parts of the bicycle.

10. An apparatus useful for cleaning the debris-laden free wheel gear means of an assembled bicycle having a rear axle comprising:

a reservoir adapted to be secured to said rear axle;

said reservoir including said rear axle, and said reservoir further includes a securement assembly including an arm having first and second ends and being secured at said first end to said front wall, and a slotted member secured to said arm at said second end and being adapted to be fitted on said rear axle;

said reservoir further including a receptacle adapted to hold a quantity of liquid cleaning composition and to collect debris removed from the free wheel gear means; and said reservoir still further including a front wall and a back wall of unequal heights, said front wall being relatively low to allow access to the free wheel gear means so that liquid cleaning composition from the receptacle can be manually applied to the free wheel gear means and said rear wall is relatively high to reduce the amount of liquid cleaning composition and debris contacting other parts of the bicycle.

11. An apparatus useful for cleaning the debris-laden chainrings of an assembled bicycle having a bicycle frame comprising:

a reservoir adapted to be secured to the bicycle in proximity to the chainrings;

said reservoir including a receptacle adapted to hold a quantity of liquid cleaning composition and to collect debris removed from the chainrings; and said reservoir further including a back wall which is notched to allow said reservoir to be placed around a component of the bicycle frame, said back wall being truncated to allow back access to the chainrings.

12. An apparatus useful for cleaning the debris-laden free wheel gear means of an assembled bicycle having a chain comprising:

a reservoir adapted to be secured to the bicycle in proximity to the free wheel gear means;

said reservoir including a receptacle adapted to hold a quantity of liquid cleaning composition and to collect debris removed from the chainrings; and said reservoir further includes a front wall, a back, wall, and at least one end wall between said front and back walls and a rotatable member located near said end wall at least partially in said receptacle and adapted to rotate in response to being contacted with the chain as the chain moves over said rotatable member.

13. An apparatus useful for cleaning the debris-laden transmission of an assembled bicycle having a bicycle frame, the transmission including chainrings and free wheel gear means, which apparatus comprises:

a first reservoir adapted to be secured to the bicycle in proximity to the chainrings, said first reservoir including a first receptacle adapted to hold a quantity of liquid cleaning composition and to collect debris removed from the chainrings, said first reservoir further including a back wall which is notched to allow said first reservoir to be placed around a component of the bicycle frame and is truncated to allow back access to the chainrings; and a second reservoir adapted to be secured to the bicycle separately from said first reservoir in proximity to the free wheel gear means, said second reservoir including a second receptacle adapted to hold a quantity of liquid cleaning composition and to collect debris removed from the free wheel gear means.

14. An apparatus useful for cleaning the debris-laden transmission of an assembled bicycle having a bicycle frame, the transmission including chainrings and free wheel gear means, which apparatus comprises:

a first reservoir adapted to be secured to the bicycle in proximity to the chainrings, said first reservoir including a first receptacle adapted to hold a quantity of liquid cleaning composition and to collect debris removed from the chainrings; and a second reservoir adapted to be secured to the bicycle separately from said first reservoir in proximity to the free wheel gear means, said second reservoir including a second receptacle adapted to hold a quantity of liquid cleaning composition and to collect debris removed from the free wheel gear means, said second reservoir having a second securement assembly and a front wall, said second securement assembly including an arm having first and second ends and being secured at said first end to said front wall, and a slotted member secured to said arm at said second end and being adapted to be fitted on said rear axle.

15. The apparatus of claim 14 wherein said second securement assembly further includes a bolt/nut combination adapted to render said slotted member substantially stationary relative to said arm.

16. The apparatus of claim 14 wherein said free wheel gear means includes a free wheel gear cluster and said second reservoir is sufficiently large to catch substantially all of the run-off of liquid cleaning composition from the free wheel gear cluster.

17. The apparatus of claim 14 wherein said second reservoir includes a back wall which is notched to allow said second reservoir means to be placed around the rear hub.

18. A method for cleaning debris from the debris-laden transmission of an assembled bicycle having a bicycle frame and a rear axle, the transmission including chainrings and free wheel gear means, which method comprises:

placing the first receptacle of claim 14 in proximity to the chainrings and securing said first reservoir to the bicycle frame;

placing the second receptacle of claim 14 in proximity to the free wheel gear means and securing said second reservoir to the rear axle;

applying liquid cleaning composition from said first receptacle to the chainrings and causing debris and liquid cleaning composition from the chainrings to collect in said first receptacle;

applying liquid cleaning composition from said second receptacle to the free wheel gear means and causing debris and liquid cleaning composition from the free wheel gear means to collect in said second receptacle;

removing said first reservoir from the bicycle frame; and removing said second reservoir from the rear axle.

19. The method of claim 18 wherein liquid cleaning composition from said first receptacle is manually applied to the chainrings, and liquid cleaning composition from said second receptacle is manually applied to the free wheel gear means.

* * * * *

UNITED STATES PATENT AND TRADEMARK OFFICE
CERTIFICATE OF CORRECTION

PATENT NO.   :   5,069,470
DATED        :   Dec. 3, 1991
INVENTOR(S)  :   Robert A. Spencer It is certified that error appears in the above-identified patent and that said Letters Patent is hereby corrected as shown below:

Column 6, line 63 change "axis" to -- axle --.

Column 8, line 24 after "back" delete the comma.

Signed and Sealed this

Twenty-second Day of June, 1993

Attest:

MICHAEL K. KIRK

*Attesting Officer*    Acting Commissioner of Patents and Trademarks